Patented Jan. 6, 1948

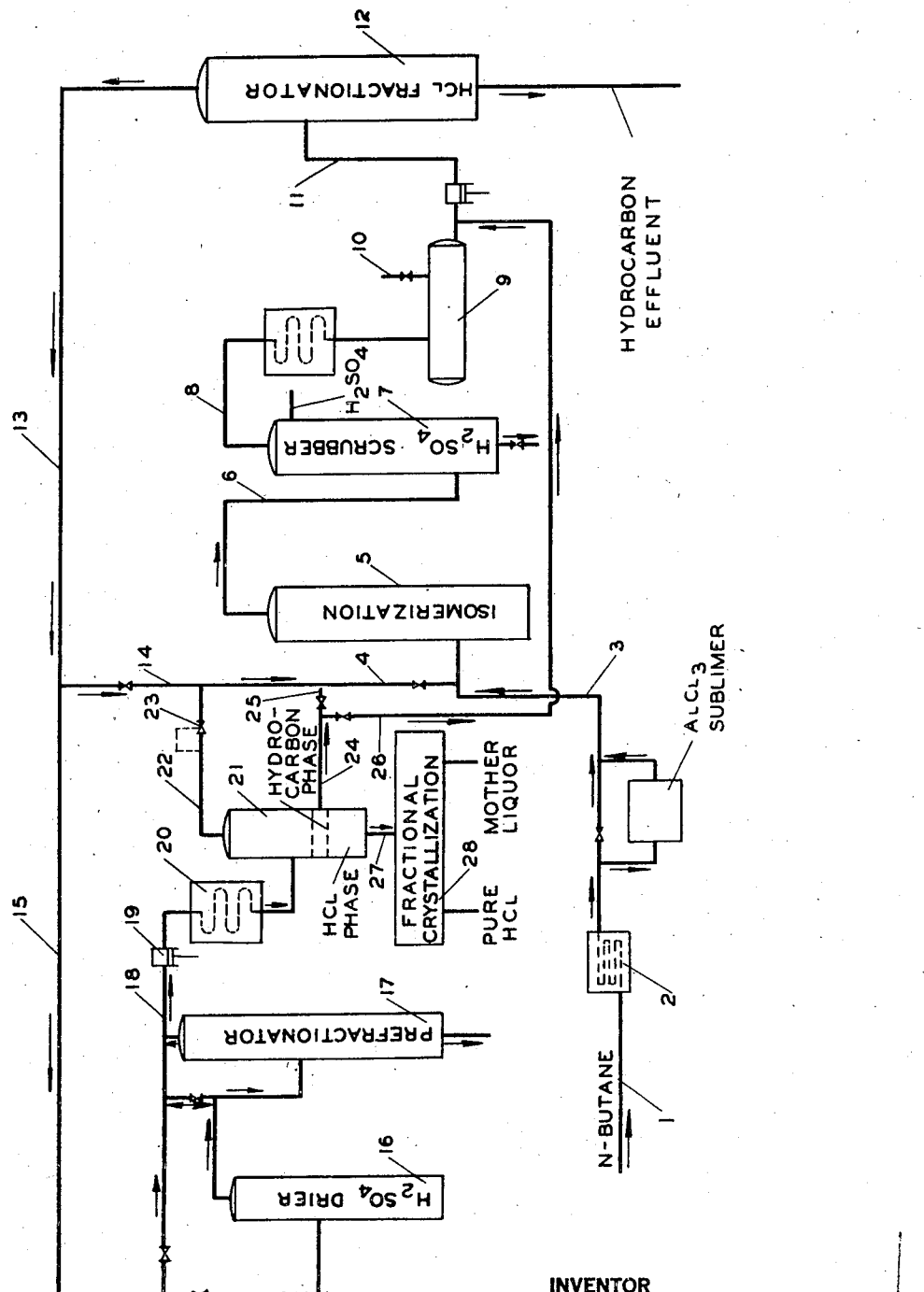

2,433,996

UNITED STATES PATENT OFFICE 2,433,996

HYDROGEN CHLORIDE RECOVERY IN A BUTANE ISOMERIZATION PROCESS

John W. Latchum, Jr., Bartlesville, Okla., assignor to Phillips Petroleum Company, a corporation of Delaware Application May 27, 1944, Serial No. 537,715

2 Claims. (Cl. 260—683.5)

1

This invention relates to the recovery of hydrogen chloride from admixture with normally gaseous hydrocarbons, usually paraffins such as normal butane, isobutane, propane, ethane or methane and mixtures of the foregoing. More particularly it relates to a process for recovering hydrogen chloride in substantially pure form from the effluent of the isomerization of normal butane to isobutane by means of aluminum chloride in the presence of hydrogen chloride as a promoter and wherein the vaporous aluminum chloride containing effluent is scrubbed with a liquid non-volatile strong mineral acid whereby all of the aluminum chloride is converted to hydrogen chloride which appears in the scrubbed effluent in addition to the hydrogen chloride employed in the conversion chamber as activator.

The principal object of the present invention is to provide an improved process of recovering substantially pure hydrogen chloride from an anhydrous gaseous mixture of hydrogen chloride and normally gaseous hydrocarbon. Another object is to provide such a process wherein the normally gaseous hydrocarbon is a paraffin ranging from methane to butane. Another object is to provide an improved process of recovering substantially pure hydrogen chloride from the vaporous effluent of the isomerization of normal butane by means of- aluminum chloride which effluent has been scrubbed with a liquid non-volatile strong mineral acid whereby its aluminum chloride content has been converted to hydrogen chloride which hydrogen chloride is normally withdrawn from the system in admixture with hydrocarbons. Another object is to provide an improved method of recovering hydrogen chloride free of hydrocarbon impurities from a liquid anhydrous mixture of hydrogen chloride and normally gaseous hydrocarbon. Another object is to provide a method of recovering hydrogen chloride practically free of hydrocarbon impurity from such a liquid anhydrous mixture which contains at least 95 molar per cent of hydrogen chloride. Numerous other objects will more fully hereinafter appear.

The accompanying drawing portrays diagrammatically one arrangement of equipment which is suitable for carrying out the present invention.

In accordance with the present invention,

2 anhydrous substantially pure hydrogen chloride is recovered from an anhydrous gaseous mixture of hydrogen chloride and normally gaseous hydrocarbon, usually paraffinic and ranging from methane to butane, by liquefying such a gaseous mixture, effecting separation of the resulting liquid into two liquid phases namely a hydrocarbon phase and a substantially pure hydrogen chloride phase, and separately withdrawing these two liquid phases.

The liquefaction of the normally gaseous mixture of hydrogen chloride and normally gaseous hydrocarbon is usually effected by compression and cooling. In some cases compression without cooling is employed. In other cases cooling at atmospheric pressure is employed. In most cases where compression is used cooling is also necessary in order that the resulting liquid may assume two liquid phases immiscible with each other.

The degree of compression and the extent of cooling required to effect liquefaction and separation of resulting liquid into two liquid phases will depend upon the specific composition of the mixture being treated, namely the proportion of hydrogen chloride in the mixture and the proportion and type of the various normally gaseous hydrocarbons which may be present. These principles underlying successful practice of the invention will be well understood by those skilled in the art in the light of this disclosure. It is well known that the liquefaction of the normally gaseous paraffins becomes easier as one proceeds from methane to butane. The selection of conditions of pressure and temperature to which the normally gaseous mixture being treated must be brought in order to effect its liquefaction and separation into two liquid phases, will be well within the skill of the art in the light of this disclosure.

Preferably, the feed consisting of normally gaseous hydrocarbon and hydrogen chloride will contain more than 50 molar per cent of hydrogen chloride in order to be certain that upon liquefaction it will be capable of separation into two liquid phases. For the same reason the molar concentration of hydrogen chloride in the feed usually will not exceed 95 molar per cent since it has been found that normally gaseous hydrocarbons, especially the paraffins ranging from methane to butane are soluble to a limited extent in pure anhydrous liquid hydrogen chloride so that it is impossible to effect separation into two phases at hydrogen chloride concentrations in excess of 95 molar per cent.

Ordinarily my invention involves the compression of the hydrogen chloride-normally gaseous hydrocarbon mixture to a high pressure where at ordinary atmosphere cooling temperatures at least a major portion of the hydrogen chloride and the hydrocarbon are condensed and separated into two liquid phases namely a hydrocarbon phase with some hydrogen chloride and a heavier hydrogen chloride phase with some hydrocarbon. This hydrogen chloride phase has been found to usually contain at least 95 molar per cent of hydrogen chloride, the balance being hydrocarbon. These two liquid phases are separately withdrawn from the separating unit. The hydrogen chloride phase may be bottled for sale.

If desired, the hydrogen chloride phase may be further treated and the hydrogen chloride content thereof recovered practically free of hydrocarbon impurity by fractional crystallization. This fractional crystallization may be carried out by cooling the hydrogen chloride phase to a point at which crystalline hydrogen chloride forms and separating the crystals of hydrogen chloride from the mother liquor. Upon melting of these crystals, there is obtained anhydrous hydrogen chloride practically free of hydrocarbon impurities.

The invention has particular application in the recovery in pure form of the excess recycle hydrogen chloride formed in those butane isomerization plants which use a sulfuric acid contactor after the reactor for freeing the vaporous isomerization effluent from aluminum chloride. This volatilized aluminum chloride is converted to hydrogen chloride by the action of the sulfuric acid. In normal practice, it is necessary to vent a portion of this hydrogen chloride from the recycle system in order to prevent its accumulation to an undesirable level. The present invention enables this excess hydrogen chloride to be recovered as substantially pure and anhydrous hydrogen chloride. Furthermore, the process may be so carried out that a third gaseous phase is present in the separation vessel which is rich in hydrogen chloride and which can be employed as a source of hydrogen chloride in the isomerization. In addition, the liquid hydrocarbon phase which is formed in the separation unit is conveniently recycled to the hydrogen chloride fractionator whereby its content of hydrogen chloride is recovered.

An embodiment of the invention as employed in combination with the isomerization of normal butane to isobutane by means of aluminum chloride using hydrogen chloride as a catalyst promoter is illustrated in the drawing.

In the drawing:

Fresh normal butane feed entering via line 1 is preheated to a suitable temperature in heater 2 and passes via line 3 after admixture with an appropriate amount of hydrogen chloride via line 4 into isomerization chamber 5. The vaporous isomerization effluent contains some volatilized aluminum chloride and passes via line 6 into sulfuric acid scrubber 7 where all this aluminum chloride is converted to hydrogen chloride which appears in the scrubbed effluent leaving via line 8 which after cooling is passed to fractionator feed tank 9. Fractionator feed tank 9 is provided with a vent absorber 10 for the purpose of taking off ethane, methane and hydrogen. Usually liquid butane is employed as the absorbing liquid in vent absorber 10. The isomerization effluent is passed via line 11 to hydrogen chloride fractionator 12. This fractionator may conveniently take the form of a hydrogen chloride stripper. It has become standard in the art to use the hydrogen chloride fractionator as a stripper so that careful fractionation with a large number of plates is not necessary.

The bottoms product from fractionator 12 contains the isobutane product, the unconverted normal butane and the propane together with any heavier components. The overhead contains practically all of the hydrogen chloride in admixture with any hydrogen, some methane, ethane, propane and some isobutane and normal butane. It is withdrawn via line 13 whence a portion may be recycled to the isomerization unit via line 14 and the balance is passed via line 15 to the unit which constitutes the essence of my invention.

It is desirable to pass the material flowing in line 15 through a sulfuric acid drier 16 as a safety measure before its compression. In addition, the material may be optionally subjected to prefractionation in prefractionator 17 to remove a substantial proportion of the hydrocarbon impurities especially all of the $C_4$'s and a part of the propane. As shown, either or both of the sulfuric acid drier 16 and prefractionator 17 may be bypassed. The mixture of hydrogen chloride and hydrocarbon is passed via line 18 to compressor 19 which compresses it to the pressure necessary to effect liquefaction. From compressor 19, the material passes through cooler 20 from which it emerges with the major portion of the hydrogen chloride and hydrocarbon in liquid phase. The material then flows to separating vessel 21 where it is allowed to separate into a liquid hydrocarbon phase and a liquid hydrogen chloride phase. Usually a third gaseous phase is also formed. It has been found convenient to use this gaseous phase as a source of the hydrogen chloride used as promoter in the isomerization. This may be done by withdrawing it through line 22 and reducing its pressure by pressure regulator valve 23 whence the gaseous phase at reduced pressure is passed via line 4 to converter 5.

The hydrocarbon liquid phase is usually the upper liquid phase and is withdrawn via line 24 whence it may be removed from the system via line 25 or passed via line 26 into admixture with the isomerization effluent and treated in column 12 for recovery of its hydrogen chloride content in the overhead. If desired it may be employed to reflux column 12, although since conventional practice is to operate column 12 as a stripper only, the feed is ordinarily introduced at the top thereof.

The hydrogen chloride liquid phase which is usually the lower liquid phase in vessel 21 is withdrawn via line 27 and usually comprises hydrogen chloride in a concentration of 95 molar per cent or greater. If desired, it may be further purified by passage to fractional crystallization unit 28 where it is separated into a fraction of hydrogen chloride practically free of hydrocarbon contaminants and a mother liquor which is enriched in hydrocarbon and depleted in hydrogen chloride. In some cases, depending upon the pressure, temperature and concentration or composition of the two liquid phases present in the vessel 21, they may change their relative position in which case the draw-off lines are connected appropriately.

While the residual gas from the high pressure process appearing in vessel 21 may be vented to the air, the preferred method involves its return to the unit in the manner shown in the drawing with subsequent elimination of its light gaseous content from the system through the fractionator feed tank vent absorber 10.

While the liquid non-volatile mineral acid used in scrubber 7 is ordinarily concentrated sulfuric acid, it may be any other suitable acid of this designation such as phosphoric acid.

Example

The recycle stream from the hydrogen chloride stripper at a plant at which normal butane was isomerized to isobutane by aluminum chloride as the catalyst using hydrogen chloride as the promoter had the following composition:

| | Mol Per Cent |
|---|---|
| Hydrogen chloride | 50.00 |
| Hydrogen | 4.82 |
| Methane | 16.00 |
| Ethane | 0.23 |
| Propane | 4.80 |
| Isobutane | 17.00 |
| N-butane | 7.15 |
| | 100.00 |

This stream was passed through a sulfuric acid drier and then through a prefractionation step corresponding to element 17 on the drawing and was thus reduced to the following composition:

| | Mol Per Cent |
|---|---|
| Hydrogen chloride | 69.5 |
| Hydrogen | 6.7 |
| Methane | 22.2 |
| Ethane | .3 |
| Propane | 1.3 |
| | 100.00 |

This stream was compressed to a pressure of 450 pounds per square inch gage and cooled to a temperature of 40 F. whereupon the liquid was separated into two liquid phases. The hydrogen chloride liquid phase had the following composition:

| | Mol Per Cent |
|---|---|
| Hydrogen chloride | 95.0 |
| Methane | 2.7 |
| Ethane | 0.6 |
| Propane | 1.7 |
| | 100.00 |

The hydrocarbon liquid phase contained 15 mol per cent of hydrogen chloride. The hydrogen chloride and hydrocarbon liquid phases were separately withdrawn from the separating vessel. The hydrocarbon phase was recycled to the hydrogen chloride stripper in the manner shown in the drawing. The hydrogen chloride phase constituted the by-product of the isomerization process and represented the excess hydrogen chloride made in the sulfuric acid scrubber. The gaseous phase was fed to the isomerization unit as a source of hydrogen chloride promoter therefor.

From the foregoing, numerous advantages of the present invention will be apparent to those skilled in the art. The present invention makes possible in a simple and economical way the recovery of concentrated hydrogen chloride from admixture with normally gaseous hydrocarbon. Previous proposals for accomplishing this have been excessively complicated and have not been economically feasible. In addition, the present invention when applied to the isomerization of normal butane in the manner suggested enables the recovery in pure form of the hydrogen chloride made in the sulfuric acid scrubber, provides a highly satisfactory hydrogen chloride recycle stream and enables recovery of the hydrogen chloride content of the hydrocarbon phase in a novel and practical manner. Numerous other advantages will be apparent to those skilled in the art.

As used herein and in the accompanying claims, the term "substantially pure hydrogen chloride" is intended to denote a purity of at least 95 molar per cent.

I claim:

1. In the process of isomerizing normal butane to isobutane which comprises subjecting said normal butane to the action of hydrogen chloride and aluminum chloride under such conditions that isomerization of normal butane to isobutane is the principal reaction, withdrawing a vaporous reaction effluent containing volatilized aluminum chloride, scrubbing said effluent with a liquid non-volatile strong mineral acid and thereby converting the aluminum chloride content thereof to hydrogen chloride, passing the scrubbed effluent to a hydrogen chloride fractionator and there taking overhead a gaseous mixture containing from 50 to 95 mol per cent hydrogen chloride in admixture with saturated normally gaseous hydrocarbons containing from 1 to 4 carbon atoms per molecule in which a substantial proportion of methane is present, the improvement which comprises liquefying at least a portion of said overhead by compressing and cooling same, separating the resulting liquid into two liquid phases namely a hydrocarbon phase and a substantially pure hydrogen chloride phase, separately withdrawing said phases, and passing the hydrocarbon phase to said hydrogen chloride fractionator in admixture with said scrubbed effluent and fractionating same along therewith.

2. In the process of isomerizing normal butane to isobutane which comprises subjecting said normal butane to the action of hydrogen chloride and aluminum chloride under such conditions that isomerization of normal butane to isobutane is the principal reaction, withdrawing a vaporous reaction effluent containing volatilized aluminum chloride, scrubbing said effluent with a liquid non-volatile strong mineral acid and thereby converting the aluminum chloride content thereof to hydrogen chloride, passing the scrubbed effluent to a hydrogen chloride fractionator and there taking overhead a gaseous mixture containing from 50 to 95 mols per cent hydrogen chloride in admixture with saturated normally gaseous hydrocarbons containing from 1 to 4 carbon atoms per molecule in which a substantial proportion of methane is present, the improvement which comprises liquefying at least a portion of said overhead by compressing and cooling same, separating the resulting liquid into two liquid phases namely a hydrocarbon phase and a substantially pure hydrogen chloride phase and a gaseous phase which is rich in hydrogen chloride, separately withdrawing said phases, passing said gaseous phase at reduced pressure to said isomerization step as a source of hydrogen chloride therefor, and passing the hydrocarbon phase to said hydrogen chloride fractionator in admixture with said scrubbed effluent and fractionating same along therewith.

JOHN W. LATCHUM, JR.

REFERENCES CITED

The following references are of record in the file of this patent:

UNITED STATES PATENTS

| Number | Name | Date |
|---|---|---|
| 1,422,838 | Curme | July 18, 1922 |
| 2,070,098 | Twomey | Feb. 9, 1937 |
| 2,227,953 | Baehr | Jan. 7, 1941 |
| 2,300,235 | Pines et al. | Oct. 27, 1942 |
| 2,315,762 | Ax et al. | Apr. 6, 1943 |
| 2,342,838 | Brunjes | Feb. 29, 1944 |
| 2,365,917 | Thomas | Dec. 26, 1944 |
| 2,375,321 | Nysewander et al. | May 8, 1945 |

OTHER REFERENCES

Glockler et al., Jour. Chem. Physics, vol. 1, 714–6 (1933). (Patent Office Library.)